United States Patent [19]

Martes et al.

[11] Patent Number: 4,921,580
[45] Date of Patent: May 1, 1990

[54] SOLAR WATER DISTILLER

[76] Inventors: Providencio Martes; Miguel A. Villalobos, both of Calle José de Diego 95, Ciales, P.R. 00638

[21] Appl. No.: 230,527

[22] Filed: Aug. 10, 1988

[51] Int. Cl.$^5$ .................... B01D 3/10; B01D 3/42
[52] U.S. Cl. ........................ 202/205; 126/425; 126/438; 159/903; 159/DIG. 16; 202/185.1; 202/234; 203/2; 203/11; 203/91; 203/DIG. 1; 203/DIG. 18
[58] Field of Search ............ 202/160, 205, 234, 181, 202/193, 196, 185.1; 203/10, 11, 1, 2, 91, DIG. 1, DIG. 17, DIG. 18; 159/903, DIG. 16; 137/386; 126/425, 438, 424

[56] References Cited

U.S. PATENT DOCUMENTS

| 2,002,621 | 5/1935 | Wiesler | 202/160 |
|---|---|---|---|
| 3,300,393 | 1/1967 | Fisher | 159/903 |
| 3,330,740 | 7/1967 | Duffy | 159/903 |
| 3,338,797 | 8/1967 | Hermanset et al. | 159/903 |
| 3,998,206 | 12/1976 | Vahn | 126/425 |
| 4,010,614 | 3/1977 | Arthur | 126/425 |
| 4,204,914 | 5/1980 | Diggs | 159/903 |
| 4,227,866 | 10/1980 | Stubbs | 60/531 |
| 4,304,637 | 12/1981 | Robbins | 203/11 |
| 4,312,709 | 1/1982 | Stark et al. | 202/234 |
| 4,371,623 | 2/1983 | Taylor | 202/160 |
| 4,377,441 | 3/1983 | Kimmell et al. | 202/160 |
| 4,488,935 | 12/1984 | Ruhe | 202/177 |
| 4,495,034 | 1/1985 | Lucas | 202/181 |
| 4,543,944 | 10/1985 | Schultz | 126/419 |
| 4,566,434 | 1/1986 | Lindenbauer | 126/440 |
| 4,584,061 | 4/1986 | Shelton | 202/185.6 |
| 4,606,794 | 8/1986 | Wyckoff | 159/903 |
| 4,639,293 | 1/1987 | Lew | 202/205 |
| 4,649,899 | 3/1987 | Moore | 126/425 |
| 4,749,447 | 6/1988 | Lew | 159/903 |
| 4,756,802 | 7/1988 | Finney | 159/903 |

FOREIGN PATENT DOCUMENTS 0001870  4/1883  United Kingdom ............... 159/903

Primary Examiner—Virginia Manoharan
Attorney, Agent, or Firm—Leon Gilden

[57] ABSTRACT

A solar water distiller is set forth utilizing a spherical boiler formed with an underlying concave reflective lens arranged for tracking of the position of the sun to effect boiling of water provided within the solar boiler. Water vapor is forcibly removed from the uppermost portion of the spherical boiler by a solar powered pump directing the cooling water into a condensate tank that is provided with a pressure relief valve. The spherical boiler is provided with a float level and a pressure gauge to control the actuation of a valve limiting water provided to the spherical boiler to maintain the spherical boiler with a half volume of fluid for maintaining efficiency of the boiler.

1 Claim, 1 Drawing Sheet

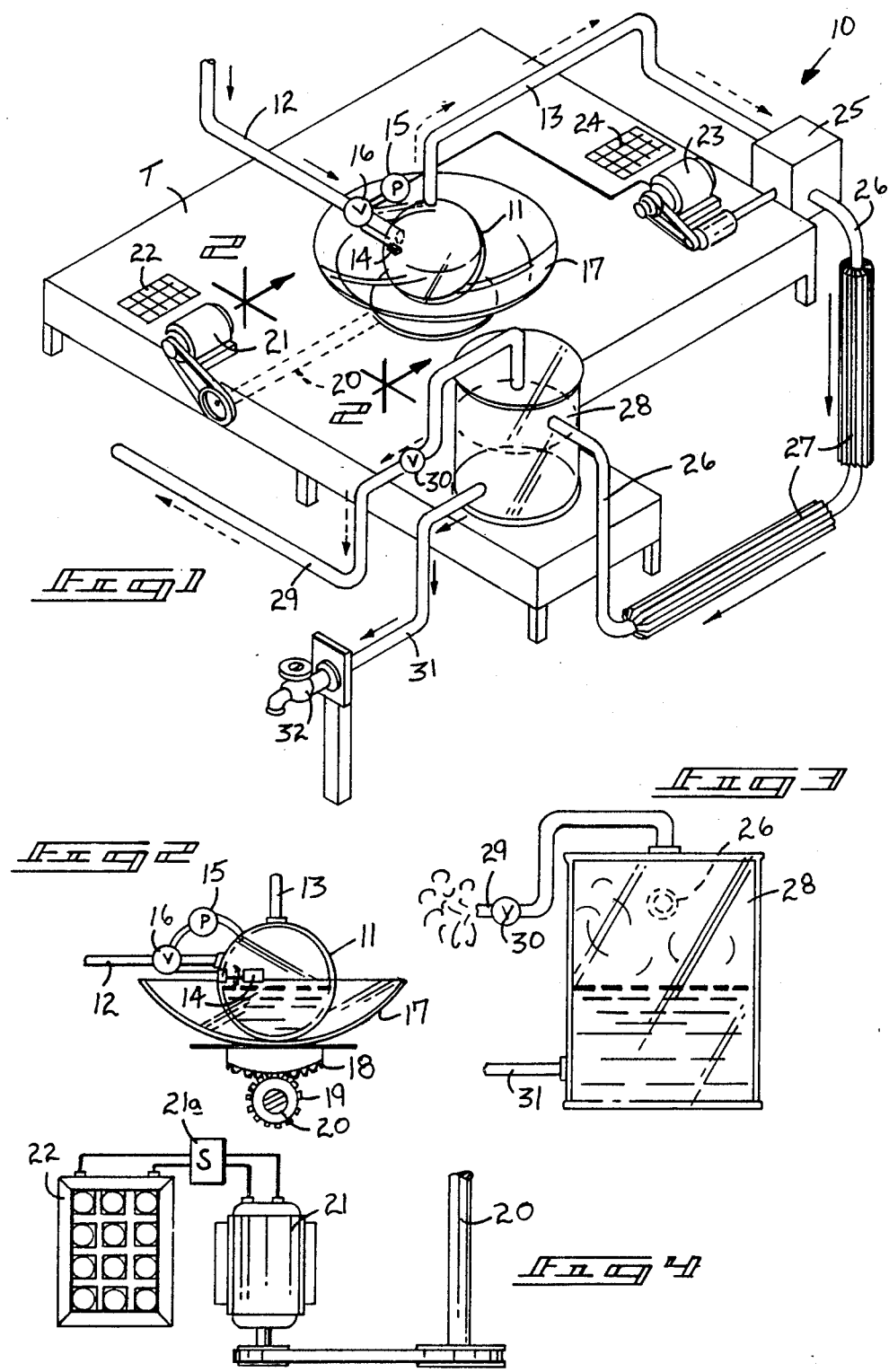

SOLAR WATER DISTILLER

BACKGROUND OF THE INVENTION

1. Field of the Invention

The field of invention relates to water distillers, and more particularly pertains to a newand improved solar water distiller to efficiently and effectively provide distilled water economically.

2. Description of the Prior Art

The use of water distillers and solar energy is well known in the prior art. As may be appreciated, however, these devices have lacked aspects to provide efficiency of operation and effectiveness, as particularly applied to small volume capacities as may be found in residential dwellings. For example, U.S. Pat. No. 4,488,935 to Ruhe sets forth a fluid distillation apparatus utilizing a microwave energy source and a solar energy collector which may both be used to heat a fluid for distillation.

U.S. Pat. No. 4,495,034 to Lucas sets forth a water effluent treatment apparatus including a reservoir mounted on a stand connected to a solvent migrator for receiving a constant supply of solution thereto. A second reservoir is provided including a cloth to contact fluid in the secondary reservoir while being maintained parallel to the sun's rays with automatic leveling means and apparatus for recirculating waste effluent. The solar distiller is constructed in two parts consisting of a secondary reservoir and collecting dome of glass panels and collecting troughs running to the exterior of the unit with optional mirrors to capture and collect reflective light from the collecting dome. The Lucas patent, while of interest, fails to provide the inner relationship of an evacuating solar powered pump and solar tracking organization to efficiently and effectively distill water.

U.S. Pat. No. 4,566,434 to Lindenbauer sets forth a solar tracking energy collector to focus sun's rays at a desired orientation including a lens to focus the rays of the sun upon indentation of a collector which has a liquid conducting passageway fitted therearound for absorbing heat of the sun's rays and conducted to it by the lens.

U.S. Pat. No. 4,584,061 to Shelton sets forth a desalinization apparatus including a spherical tank provided with means to introduce water to be converted to steam in a lower zone of the tank and structure to guide the steaminto a condensate bowl within the same spherical tank. The Shelton patent is of interest to note the use of a spherical tank, but is of an organization of complexity remote from that of the instant invention.

U.S. Pat. No. 4,639,293 to Lew sets forth a solar powered still wherein water to be distilled is supplied from a reservoir vessel sealed off after a batch loading wherein the vessel is elevated above a solar collector. Water is fed into a heater through an array of tubings through the solar collector with water directed by gravity through an orifice and heat exchanger condenser. The array of the heater tubing is routed through a solar collector is connected to another vertical tubing directed into an overflow tank. The Lew patent is of interest relative to the utilization of a solar powered device, but lacks the refinements of an evacuation pump controlled by pressure gauge to maintain a predetermined pressure within a spherical boiler to effect efficiency within a distilling apparatus.

As such, it may be appreciated that there is continuing need for a new and improved solar water distiller that effectively and efficiently distills water to a potable form.

SUMMARY OF THE INVENTION

In view of the foregoing disadvantages inherent in the known types of water distillers now present in the prior art, the present invention provides a solar water distiller which utilizes efficiency of construction to effectively distill water from a solar fired boiler and evacuated therefrom by means of a solar powered evacuation pump and condensed into a condensate tank for selective removal therefrom. As such, the general purpose of the present invention, which will be described subsequently in greater detail, is to provide a new and improved solar water distiller which has all the advantages of the prior art water distillers and none of the disadvantages.

To attain this, the present invention comprises a spherical boiler provided with a level maintaining float gauge and a pressure gauge to maintain a predetermined quantity of water within a spherical boiler and further formed with an underlying convex reflective lens pivotally mounted for tracking the sun during movement to efficiently heat water within the boiler and have the same evacuated by means of a pump to direct the evacuated vapor through a condensate conduit into a storage tank provided with a pressure relief valve to safely maintain a supply of water within the tank.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved solar water distiller which has all the advantages of the prior art solar water distiller and none of the disadvantages.

It is another object of the present invention to provide a new and improved solar water distiller which may be easily and efficiently manufactured and marketed.

It is a further object of the present invention to provide a new and improved solar water distiller which is of a durable and reliable construction.

An even further object of the present invention is to provide a new and improved solar water distiller which is susceptible of a low cost of manufacture with regard to both materials and labor, and which accordingly is then susceptible of low prices of sale to the consuming public, thereby making such solar water distiller economically available to the buying public.

Still yet another object of the present invention is to provide a new and improved solar water distiller which provides in the apparatuses and methods of the prior art some of the advantages thereof, while simultaneously overcoming some of the disadvantages normally associated therewith.

Still another object of the present invention is to provide a new and improved solar water distiller with a spherical tank provided with a water level control apparatus to maintain a predetermined level of water within the tank and direct heated water from the tank to a storage tank by means of underlying convex lens through a condensate conduit into a storage container.

Yet another object of the present invention is to provide a new and improved solar water distiller provided with an evacuation pump to maintain a predetermined pressure within the spherical boiler.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an isometric illustration of the instant invention.

FIG. 2 is an orthographic view of the spherical boiler taken along the lines 2—2 of FIG. 1.

FIG. 3 is an orthographic cross-sectional view of the storage tank of the instant invention.

FIG. 4 is a top orthographic view of a solar powered motor as utilized by the instant invention.

DESCRIPTION OF THE PREFERRED EMBODIMENT

With reference now to the drawings, and in particular to FIGS. 1 to 4 thereof, a new and improved solar water distiller embodying the principles and concepts of the present invention and generally designated by the reference numeral 10 will be described.

More specifically, it will be noted that the solar water distiller apparatus 10 essentially comprises a spherical boiler 11 provided with an input conduit 12 to provide a predetermined flow of water or effluent to be distilled. An output conduit 13 is directed at an uppermost point of said spherical boiler to direct water vapor therefrom. A float valve 14 is pivotally mounted within the spherical boiler 11 to control a release valve 16 positioned within the input conduit 12. Further, a pressure sensing gauge 15 is formed with a sensing conduit directed interiorly of the spherical boiler 11 to also actuate the release valve 16. The pressure gauge 15 and the float valve 14 operate in concert to maintain a constant pressure within the spherical boiler 11 to maintain efficiency. It is desired that water level within the spherical boiler be maintained at substantially half of the volume of the spherical boiler wherein the pressure gauge 15 may allow the valve 16 to be opened also to maintain a desired and safe pressure level with the spherical boiler 11. Further, the pressure gauge 15 is electrically associated with a solar powered motor to operate a vacuum pump extracting vapor from within the spherical 11 to maintain and minimize pressure buildup within the spherical boiler 11 and effect efficiency of the apparatus, to be discussed below.

Underlying the spherical boiler 11 is a convex lens 17 oriented and arranged to track the sun's movement and reflect rays of the sun onto the spherical boiler to provide heating of the same. Reference to FIG. 2 illustrates an arcuate gear rack 18 fixedly secured to the convex lens 17 and in engagement with a gear pinion 19 secured to a shaft 20. The shaft 20 is directed outwardly of the support platform "S" to a first solar powered reversing motor 21. The reversing motor 21, with reference to FIG. 4, is electrically associated with a sun sensor 21a deriving and directing electrical energy through the first panel of solar cells 22. It may be appreciated that the convex lens 17 may therefore be constantly reoriented to maintain the lens in focal communication with the sun's rays and direct the rays under the solar boiler 11 to create water vapor within the boiler. The sun sensor 21a will therefore reverse the reversing motor 21 as necessary for maintaining communication with the sun's rays.

A second solar powered non-reversing motor 23 is powered by a second panel of solar cells 24 wherein the motor 23 operates a vacuum pump 25 to withdraw water vapor from within a spherical boiler 11 to desirably maintain a vacuum therein. The so derived water vapors are directed through a condenser conduit 26 formed with a series of cooling fins 27 therearound. Water vapor thereby condensed within the condenser circuit conduit 26 is directed into a storage tank 28 and directed into the storage tank 28 at an uppermost position thereof. A relief pipe 29 is formed with a relief valve 30 therein to enable escape of water vapor or condensate that exceeds a predetermined pressure level within the tank 28.

A tank output conduit 31 thereby enables distilled water to be selectively derived from the tank 28 through a conventional valve 32 for use, as deemed necessary.

As to the manner of usage and operation of the present invention therefore, the same should be apparent from the above description. Accordingly, no further discussion relative to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A solar powered water distilling apparatus comprising,
   a spherical boiler including a water input conduit and a water vapor output conduit;
   a valve positioned within said water input conduit;
   a level control means operatively associated with said valve for controlling water flow within said spherical boiler from said input conduit to maintain water within said boiler at substantially half the volume of said boiler;
   a solar energy directing means underlying said spherical boiler for directing solar energy to said boiler to create pressurized water vapor within said boiler and direct said water vapor to said output conduit;
   a vacuum pump means operatively associated with said output conduit for evacuating water vapor from said boiler;
   a condensing means including a condensing conduit positioned between said pump means and a storage tank, and said condensing conduit is formed with cooling fins therearound for condensing water vapor within said condensing conduit;
   a pressure sensing means operatively associated with said spherical boiler for controlling water pressure within said boiler by controlling operation of said valve and said vacuum pump means in response to pressure limits set within said pressure sensing means;
   a rack and pinion underlying said solar energy directing means for continuously manipulating said directing means to maintain constant orientation with solar rays;
   a reflective convex lens underlying said spherical boiler including a reversing electrical motor for manipulating said reflective convex lens;
   a first solar panel operatively actuating said reversing electrical motor;
   a sun sensor means positioned between said first solar panel and said reversing motor for selectively operating said motor to maintain association of said reflective convex lens with said solar rays;
   a solar powered non-reversing motor operatively associated with said pump means to actuate said pump means;
   and a relief pipe formed at an uppermost surface of said storage tank wherein said relief pipe is formed with a relief valve for minimizing pressure buildup within said storage tank wherein the pressure sensing means and the level control means operate in concert to maintain a constant pressure within the spherical boiler such that efficiency in boiler water vapor production is maintained.

* * * * *